(12) United States Patent
Lee et al.

(10) Patent No.: US 9,829,660 B2
(45) Date of Patent: Nov. 28, 2017

(54) OPTICAL MODULE

(71) Applicant: ELECTRONICS AND TELECOMMUNICATIONS RESEARCH INSTITUTE, Daejeon (KR)

(72) Inventors: Jong Jin Lee, Gwangju (KR); Kwon-Seob Lim, Gwangju (KR); Dae Seon Kim, Gwangju (KR); Sun-Goo Lee, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/210,476

(22) Filed: Jul. 14, 2016

(65) Prior Publication Data

US 2017/0242208 A1    Aug. 24, 2017

(30) Foreign Application Priority Data

Feb. 24, 2016   (KR) .................. 10-2016-0021811

(51) Int. Cl.
*G02B 6/42*    (2006.01)

(52) U.S. Cl.
CPC ......... *G02B 6/4244* (2013.01); *G02B 6/4204* (2013.01); *G02B 6/424* (2013.01); *G02B 6/425* (2013.01); *G02B 6/4239* (2013.01); *G02B 6/4245* (2013.01)

(58) Field of Classification Search
CPC ............................. G02B 6/4239; G02B 6/4244
See application file for complete search history.

(56) References Cited

U.S. PATENT DOCUMENTS

| 4,237,474 | A | * | 12/1980 | Ladany ................ G02B 6/4202 257/712 |
| 5,260,587 | A | * | 11/1993 | Sato .................... G02B 6/4249 257/82 |
| 5,854,867 | A |   | 12/1998 | Lee et al. |
| 6,418,251 | B1 | * | 7/2002 | Boscha ............... H01S 5/02252 372/29.02 |
| 7,443,505 | B2 |   | 10/2008 | Lee et al. |
| 8,346,037 | B2 |   | 1/2013 | Pezeshki et al. |

(Continued)

OTHER PUBLICATIONS

Tadashi Murao et al. "Lens Alignment Technique Using High-Power Laser for Hybrid Integrated Multi-Channel Transmitter Optical Sub-Assemblies", IEEE Photonics Technology Letters, Oct. 15, 2013, pp. 1958-1960, vol. 25, No. 20, IEEE.

*Primary Examiner* — Omar R Rojas

(57) ABSTRACT

There is provided an optical module. The optical module includes a light source, a wave guide to which beam output from the light source is input, a lens system configured to optically combining the light source and the wave guide, a first lens mount positioned between the light source and the lens system in an optical axis of the light source, a first adhesive configured to fix the lens system to the first lens mount, a second lens mount positioned between the wave guide and the lens system in the optical axis of the light source, and a second adhesive configured to fix the lens system to the second lens mount. Therefore, it is possible to precisely align light, to manufacture the optical module with small expenses, and to simplify processes and equipment.

15 Claims, 12 Drawing Sheets

(56) References Cited

U.S. PATENT DOCUMENTS

2003/0219211 A1 11/2003 Kim et al.
2013/0051024 A1 2/2013 Amit
2017/0017051 A1* 1/2017 Kaneko .................. G02B 7/021

* cited by examiner

OPTICAL MODULE

CROSS-REFERENCE TO RELATED APPLICATION

The present application claims priority to Korean Patent Application Number 10-2016-0021811 filed on Feb. 24, 2016, the entire disclosure of which is incorporated herein in its entirety by reference.

BACKGROUND

1. Field

An embodiment of the present invention relates to an optical module, and more particularly, to an optical module in which a light source and a wave guide are aligned by a lens.

2. Description of the Related Art

A light source and a wave guide that are provided in an optical module may be optically combined by a lens. At this time, a position of the lens is controlled so that an amount of light incident on the wave guide has a maximum value in order to align light between the light source and the wave guide. In a conventional optical module, in order to fix the lens the position of which is controlled, soldering heating or laser welding is used. The conventional optical module needs a high-temperature heater or a high-output laser for soldering melting, has a complicated structure, and includes parts prices of which increase.

Epoxy hardening is used as a lens fixing method that incurs a smaller expense than the soldering or laser welding method. In the conventional optical module in which the lens is fixed by the epoxy hardening, first, a lower portion of the lens is fixed to epoxy implanted onto a substrate and is hardened. In the hardening process, due to unbalance of amounts of contraction and expansion that are generated by asymmetry of an epoxy hardened shape, an alignment error caused by three-axis rotation θx, θy, θz as well as a change in positions of three axes X, Y, and Z is generated. In addition, when the optical module is implemented by multiple channels, a space between channels is small so that epoxy penetrates into a neighboring channel.

SUMMARY

An embodiment of the present invention relates to an optical module capable of minimizing an alignment error, reducing an expense, and simplifying process equipment.

An embodiment of the present invention relates to a multi-channel optical module capable of being made small.

An optical module according to an embodiment of the present invention includes a light source, a wave guide to which beam output from the light source is input, a lens system configured to optically combining the light source and the wave guide, a first lens mount positioned between the light source and the lens system in an optical axis of the light source, a first adhesive configured to fix the lens system to the first lens mount, a second lens mount positioned between the wave guide and the lens system in the optical axis of the light source, and a second adhesive configured to fix the lens system to the second lens mount.

The lens system includes a lens optically aligned with the light source and the wave guide and a lens support configured to support the lens and extending from the lens and inserted between the first lens mount and the second lens mount. The first adhesive fills a gap between the first lens mount and the lens support and the second adhesive fills a gap between the second lens mount and the lens support.

At least one of the first lens mount and the second lens mount includes a plurality of grooves on a surface that faces the lens system and at least one of the plurality of grooves is filled with a corresponding adhesive.

The plurality of grooves extend up and down.

The plurality of grooves are separate from each other in a horizontal direction.

The optical module further includes a light source mount on which the light source is mounted, a wave guide mount which is separate from the light source mount in the optical axis direction and on which the wave guide is mounted, and a substrate configured to support the light source mount, the wave guide mount, and the first and second lens mounts. The first lens mount is provided between the light source mount and the lens support. The second lens mount is provided between the wave guide mount and the lens support.

The substrate includes a through hole opened toward a gap between the first lens mount and the lens support and/or a gap between the second lens mount and the lens support.

The lens support extends downward from the lens and a through hole of the substrate is opened toward a lower portion of the lens support.

At least one of the first adhesive and the second adhesive is hardened epoxy.

At least one of the first lens mount and the second lens mount comprises a transparent material.

A multi-channel optical module according to an embodiment of the present invention includes a plurality of light sources separated from each other in a direction perpendicular to an optical axis, a plurality of wave guides to which beams output from the plurality of light sources are respectively input, a plurality of lens systems configured to optically combining the corresponding light sources and wave guides, at least one first lens mount positioned between the plurality of lens systems and the plurality of light sources in the optical axis direction, a first adhesive configured to fix the plurality of lens systems to the at least one first lens mount, at least one second lens mount positioned between the plurality of lens systems and the plurality of wave guides in the optical axis direction, and a second adhesive configured to fix the plurality of lens systems to the at least one second lens mount.

A plurality of grooves are formed on a surface that faces the lens system in at least one of the first lens mount and the second lens mount. The plurality of grooves are separate from each other.

The plurality of grooves extend in a direction perpendicular to the optical axis.

The plurality of grooves extend in a direction perpendicular to a direction in which the plurality of light sources are separate from each other.

The multi-channel optical module further includes at least one light source mount on which the plurality of light sources are mounted, at least one wave guide mount on which the plurality of wave guides are mounted, and a substrate configured to support the light source mount, the wave guide mount, and the first and second lens mounts. The substrate comprises a through hole opened toward between at least one of the plurality of lens systems and the first lens mount and/or at least one of the plurality of lens systems and the second lens mount and passing through the substrate.

According to an embodiment of the present invention, since a degree of freedom of light alignment in the optical axis direction is removed by the pair of lens mounts and a contact area between the lens system and the lens mounts increases, it is possible to minimize an error during light alignment and to align light with small expenses and simple processes and equipment.

Since it is possible to minimize force of static friction and electrostatic force between the lens mount and the lens system by forming the plurality of grooves in the pair of lens mounts, it is possible to easily align light. Since it is possible to minimize gripping force of a gripper, it is possible to prevent the lens system from being damaged by the gripping force.

Although viscosity of an adhesive is low or a large amount of adhesive is implanted, since it is possible to prevent the adhesive from spreading to a neighboring channel due to the plurality of grooves provided in the pair of lens mounts, it is possible to make the multi-channel optical module small.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
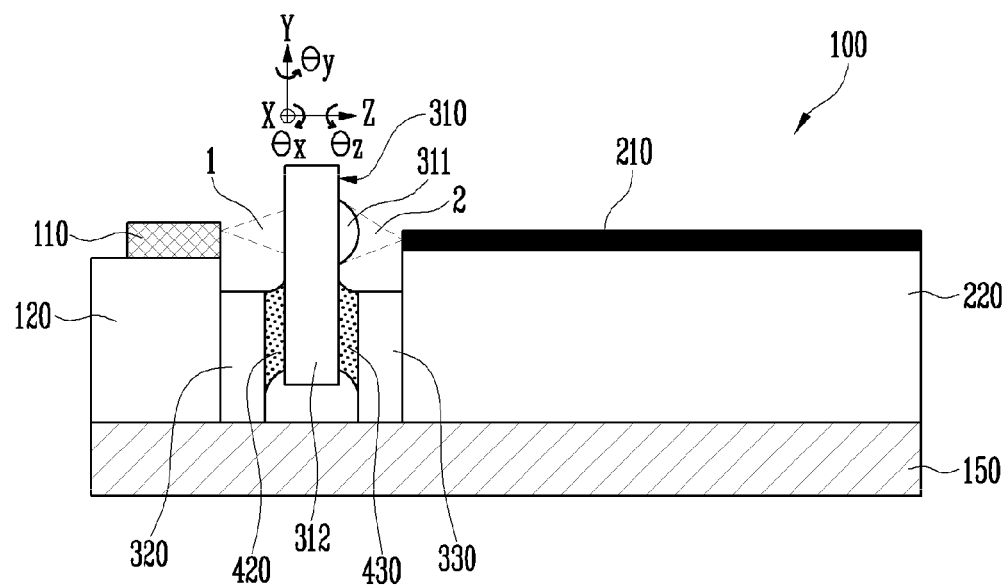
FIG. 1 is a side view of an optical module according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Throughout this specification and the claims that follow, when it is described that an element is "connected" to another element, the element may be "directly connected" to the other element or "electrically connected" to the other element through a third element. In the accompanying drawings, a portion irrelevant to description of the present invention will be omitted for clarity. Like reference numerals refer to like elements throughout.

Hereinafter, embodiments will be described in detail so that those skilled in the art may easily perform the present invention with reference to the accompanying drawings.

Figure 2:
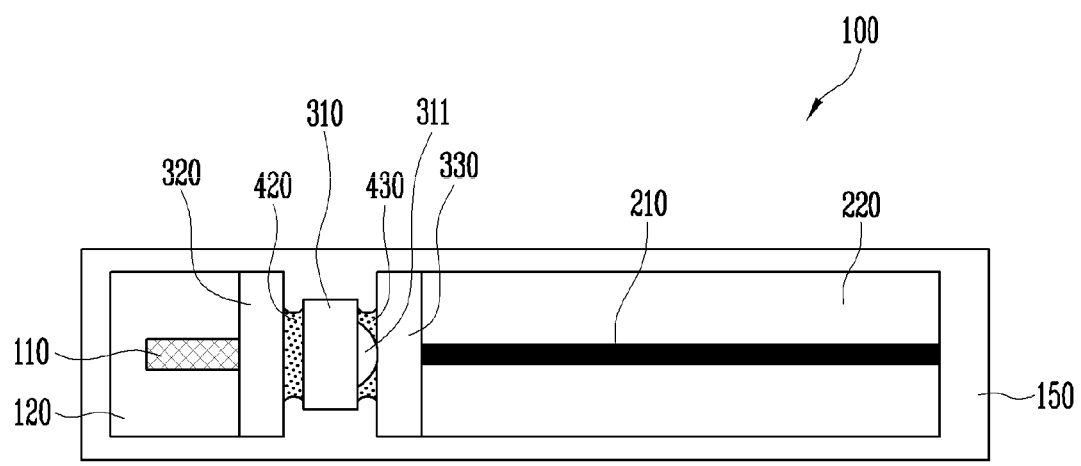
FIG. 2 is a top view of the embodiment of FIG. 1.

FIG. 1 is a side view of an optical module according to an embodiment of the present invention. FIG. 2 is a top view of the embodiment of FIG. 1. An optical module 100 according to the embodiment of the present invention includes a substrate 150, a plurality of mounts 120, 220, 320, and 330 fixed to the substrate 150, a light source 110, a wave guide 210, and a lens system 310 that are respectively fixed to the plurality of mounts.

The substrate 150 is a platform that entirely supports the optical module 100. The plurality of mounts 120, 220, 320, and 330 are respectively fixed to the substrate 150. The plurality of mounts 120, 220, 320, and 330 may be actually integrated with the substrate 150 or may be separately attached to the substrate 150.

The plurality of mounts 120, 220, 320, and 330 include a light source mount 120, a wave guide mount 220, and a pair of lens mounts 320 and 330. The light source 110 is mounted on the light source mount 120 and the wave guide 210 is mounted on the wave guide mount 220.

The light source 110 and the wave guide 210 are aligned along an optical axis of the light source 110 (hereinafter, a optical axis) and the light source mount 120 and the wave guide mount 220 are aligned to be parallel with the optical axis. The optical axis is parallel with a z axis of FIG. 1. In a direction perpendicular to the optical axis, a height direction is defined as the y axis direction of FIG. 1 and a width direction is defined as an x axis of FIG. 1.

The light source mount 120 is a rectangular that extends to be parallel with the optical axis with a predetermined height and a predetermined width. The light source 110 is fixed onto the light source mount 120 and may be positioned in a predetermined height from the substrate 150.

The light source 110 may be semiconductor laser. The light source 110 may be integrated with the light source mount 120 by a flip chip bonding (FCB) method. However, the present invention is not limited thereto. The light source 110 may be any kind of light source provided in the optical module.

The wave guide mount 220 is aligned with the light source mount 120 along the optical axis. The wave guide mount 220 is separate from the light source mount 120 in an optical axis direction. The wave guide mount 220 is a rectangular that extends to be parallel with the optical axis with a predetermined height and a predetermined width.

The wave guide 210 extends along the optical axis and beam output from the light source 110 is input thereto. An input end of the wave guide 210 is separate from an output end of the light source 110 in the optical axis direction.

The lens system 310 optically combines the light source 110 and the wave guide 210. The lens system 310 includes a lens 311 optically aligned with the light source 110 and the wave guide 210. In the lens 311, a surface that faces the wave guide 210 is a convex spherical surface and a surface that faces the light source 110 is flat. However, the present invention is not limited thereto. The lens may be any shape of lens that may collect the beam output from the light source 110 on the wave guide 210.

The light source 110 and the lens 311 are separate from each other along the optical axis so that the output end of the light source 110 is placed in a focusing distance of the lens 311. The lens 311 and the wave guide 210 are separate from each other along the optical axis so that the input end of the wave guide 210 is placed in the focusing distance of the lens 311. The laser beam 1 output from the light source 110 converges 2 while passing through the spherical surface of the lens 311 and is concentrated on the wave guide 210.

The lens system 310 includes a lens support 312 for supporting the lens 311 and fixing the lens system 310 to the pair of lens mounts 320 and 330. The lens support 312 surrounds the lens 311 and extends downward from the lens 311 in the height direction to be positioned between the pair of lens mounts 320 and 330.

The pair of lens mounts 320 and 330 include a first lens mount 320 provided in a space between the light source 110 and the lens system 310 and a second lens mount 330 provided in a space between the wave guide 210 and the lens system 310.

The optical module 100 according to the embodiment of the present invention further includes a first adhesive 420 for fixing the lens support 312 to the first lens mount 320 and a second adhesive 430 for fixing the lens support 312 to the second lens mount 330.

The first lens mount 320 is provided between the light source 110 and the lens system 310 that are separate from each other in the optical axis direction and is low so that all the beam 1 output from the light source 110 is incident on the lens 311. That is, the first lens mount 320 has a height not to block an optical path. A length with which the first lens mount 320 extends in the optical axis direction is slightly smaller than a distance by which the light source 110 and the lens support 312 are separate from each other in the optical axis direction. The first lens mount 320 may contact the light source mount 120 and the substrate 150 to be supported by the light source mount 120 and the substrate 150 and extends in the optical direction so that a minute gap is maintained between the lens support 312 and the first lens mount 320.

The first lens mount 320 may be actually integrated with the light source mount 120 and may be separately formed to be assembled. When the first lens mount 320 and the light source mount 120 are integrated with each other, up to a portion that supports the light source 110 in order to maintain the height of the light source 110, that is, a portion in which the output end of the light source 110 is positioned may be considered as the light source mount 120. A portion that is lower than the light source 110 and fills a space between the light source 110 and the lens support 312 in the optical axis direction may be referred to as the first lens mount 320.

A size of the minute gap between the first lens mount 320 and the lens support 312 may be such that the lens 311 may move in the x and y axes without being interrupted by the first lens mount 320, for example, about 10 μm.

The first adhesive 420 fills the minute gap between the first lens mount 320 and the lens support 312 so that the lens support 312 is fixed to the first lens mount 320. The first adhesive 420 may be hardened epoxy. When the first adhesive 420 is epoxy, epoxy may be hardened by an ultraviolet (UV) epoxy hardening method. At this time, the first lens mount 320 may be formed of an optically transparent material. For example, the first lens mount 320 may include silica.

The second lens mount 330 is provided between the wave guide 210 and the lens system 310 that are separate from each other in the optical axis direction and is low so that all beam 2 output from the lens 311 may be incident on the wave guide 210. That is, the second lens mount 330 has a height not to block the optical path. A length with which the second lens mount 330 extends in the optical axis direction is slightly smaller than a distance by which the wave guide 210 and the lens support 312 are separate from each other in the optical axis direction. The second lens mount 330 may contact the wave guide mount 220 and the substrate 150 to be supported by the wave guide mount 220 and the substrate 150 and extends in the optical axis direction so that a minute gap is maintained between the lens support 312 and the second lens mount 330.

The second lens mount 330 may be actually integrated with the wave guide mount 220 and may be separately formed to be assembled. When the second lens mount 330 and the wave guide mount 220 are integrated with each other, up to a portion that supports the wave guide 210 in order to maintain the height of the wave guide 210, that is, a portion in which the input end of the wave guide 210 is positioned may be considered as the wave guide mount 220. A portion that is lower than the wave guide 210 and fills a space between the wave guide 210 and the lens support 312 in the optical axis direction may be referred to as the second lens mount 330.

A size of the minute gap between the second lens mount 330 and the lens support 312 may be such that the lens 311 may move in the x and y axes without being interrupted by the second lens mount 330, for example, about 10 μm.

The second adhesive 430 fills the minute gap between the second lens mount 330 and the lens support 312 so that the lens support 312 is fixed to the second lens mount 330. The second adhesive 430 may be hardened epoxy. When the second adhesive 430 is epoxy, epoxy may be hardened by the UV epoxy hardening method. At this time, the second lens mount 330 may be formed of an optically transparent material. For example, the second lens mount 330 may include silica.

Light alignment of the light source and the wave guide and a fixing method by the first adhesive and the second adhesive are described later.

As described above, since the lens 311 is separate from the light source 110 and the wave guide 210 by the focusing distance in the optical axis direction, spaces exist between the light source 110 and the lens 311 and the lens 311 and the wave guide 210. The pair of lens mounts 320 and 330 fill the spaces to remove a degree of freedom of light alignment in the optical axis direction and to simplify a light alignment process. In addition, when the first and second adhesives are epoxy, a light alignment error in θy and θz directions that may be generated in an epoxy hardening process is reduced. In addition, since a contact area between the lens support and the lens mount may be increased by controlling width direction lengths and height direction lengths of the first and second lens mounts, the lens 311 is stable against external force such as vibration or shock.

Figure 3:
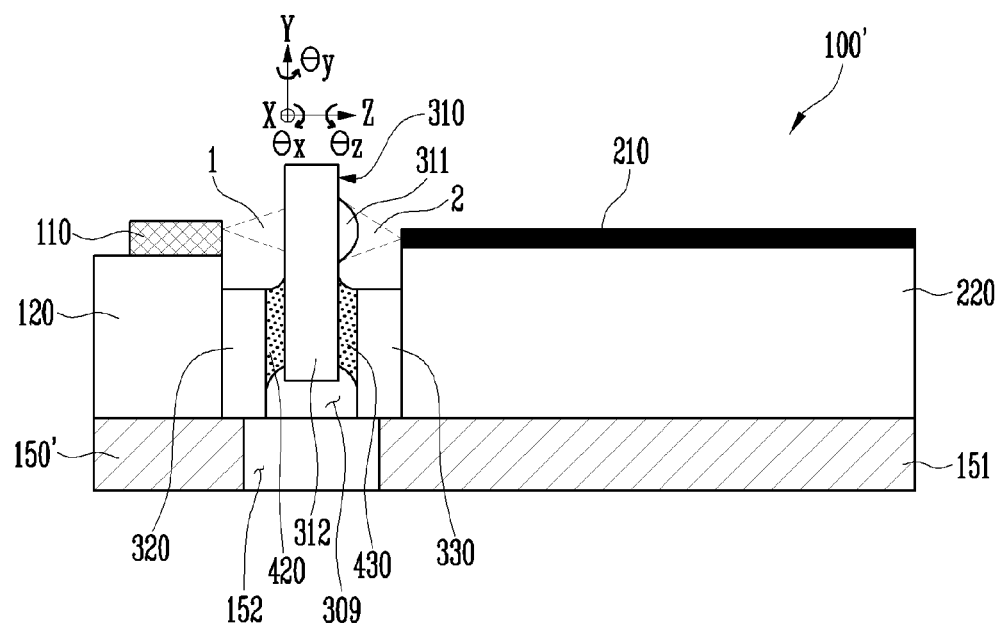
FIG. 3 is a side view of an optical module according to another embodiment of the present invention.
Figure 4:
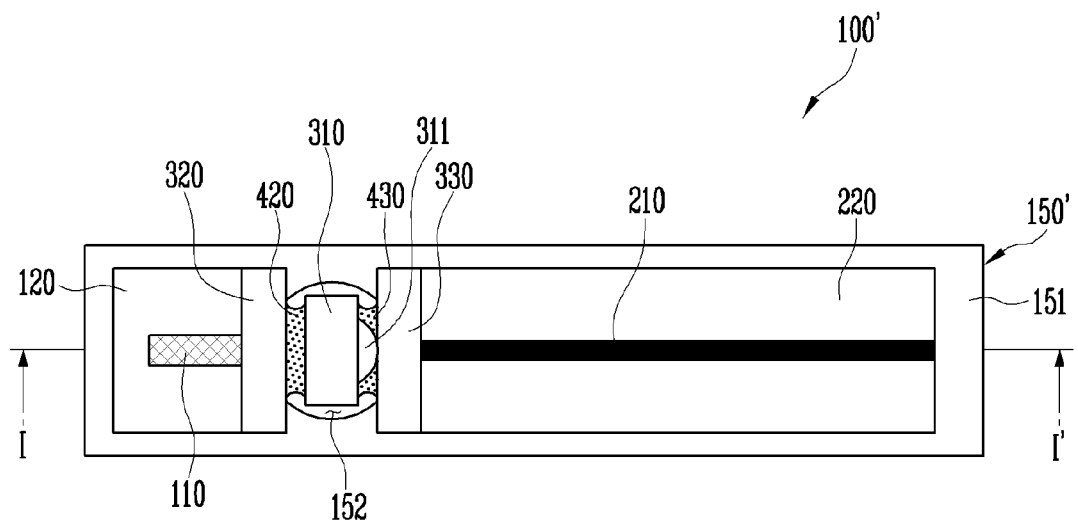
FIG. 4 is a top view of the embodiment of FIG. 3.

FIG. 3 is a side view of an optical module according to another embodiment of the present invention. FIG. 4 is a top view of the embodiment of FIG. 3. An optical module 100' according to another embodiment of the present invention includes a substrate 150', the plurality of mounts 120, 220, 320, and 330 fixed to the substrate 150', the light source 110 fixed to the plurality of mounts 120, 220, 320, and 330, the wave guide 210 and the lens system 310, and the first and second adhesives 420 and 430 for fixing the lens system 310 to the pair of lens mounts.

Since the plurality of mounts 120, 220, 320, and 330, the light source 110, the wave guide 210, the lens system 310, and the first and second adhesives 420 and 430 are as described above with reference to FIGS. 1 and 2, detailed description thereof will not be given.

The substrate 150' is a platform that entirely supports the optical module 100'. The substrate 150' includes a plate-shaped substrate body 151 on which all the plurality of mounts 120, 220, 320, and 330 may be mounted. A through hole 152 through which the first and second adhesives 420 and 430 are implanted is formed in the substrate body 151.

The substrate 150' illustrated in FIG. 3 illustrates a cross-section taken along the line I-I' of FIG. 4. The through hole 152 formed in the substrate 150' is opened toward a lower portion of the lens support 312 and is connected to a space 309 that exists in the lower portion of the lens support 312. In addition, the through hole 152 formed in the substrate 150' is connected to gaps between the pair of lens mounts 320 and 330 and the lens support 312.

In the above-described configuration, since the first and second adhesives 420 and 430 may be supplied to the lower portion of the lens support 312 through a bottom surface of the substrate 150', the lens 311 or the light source 110 and the wave guide 210 positioned in an upper portion of the lens support 312 are not contaminated by the adhesives.

Figure 5:
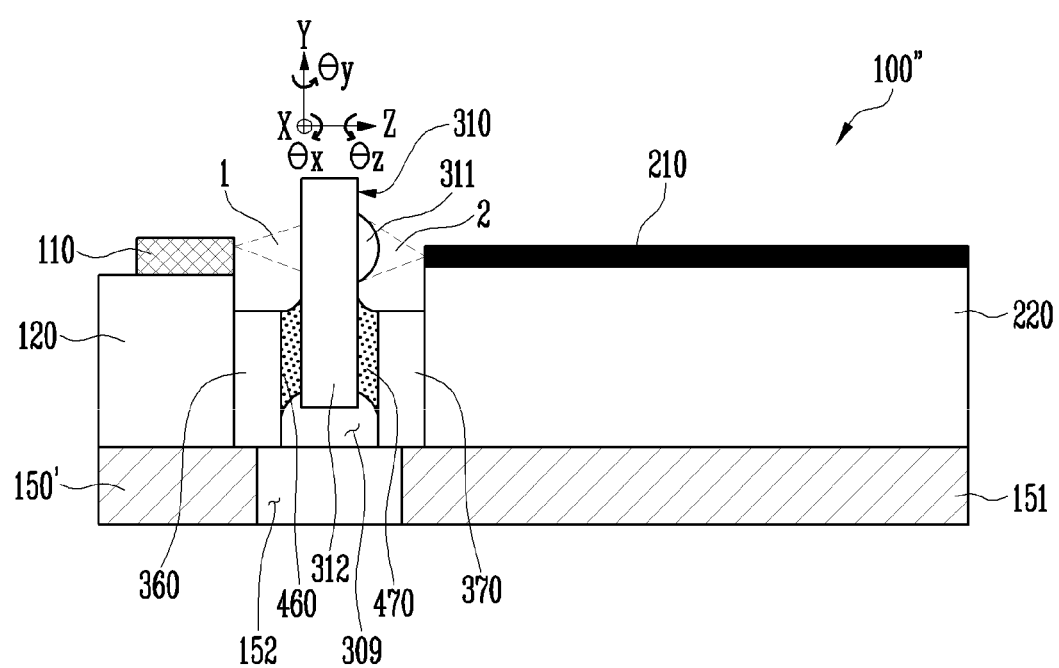
FIG. 5 is a side view of an optical module according to another embodiment of the present invention.
Figure 6:
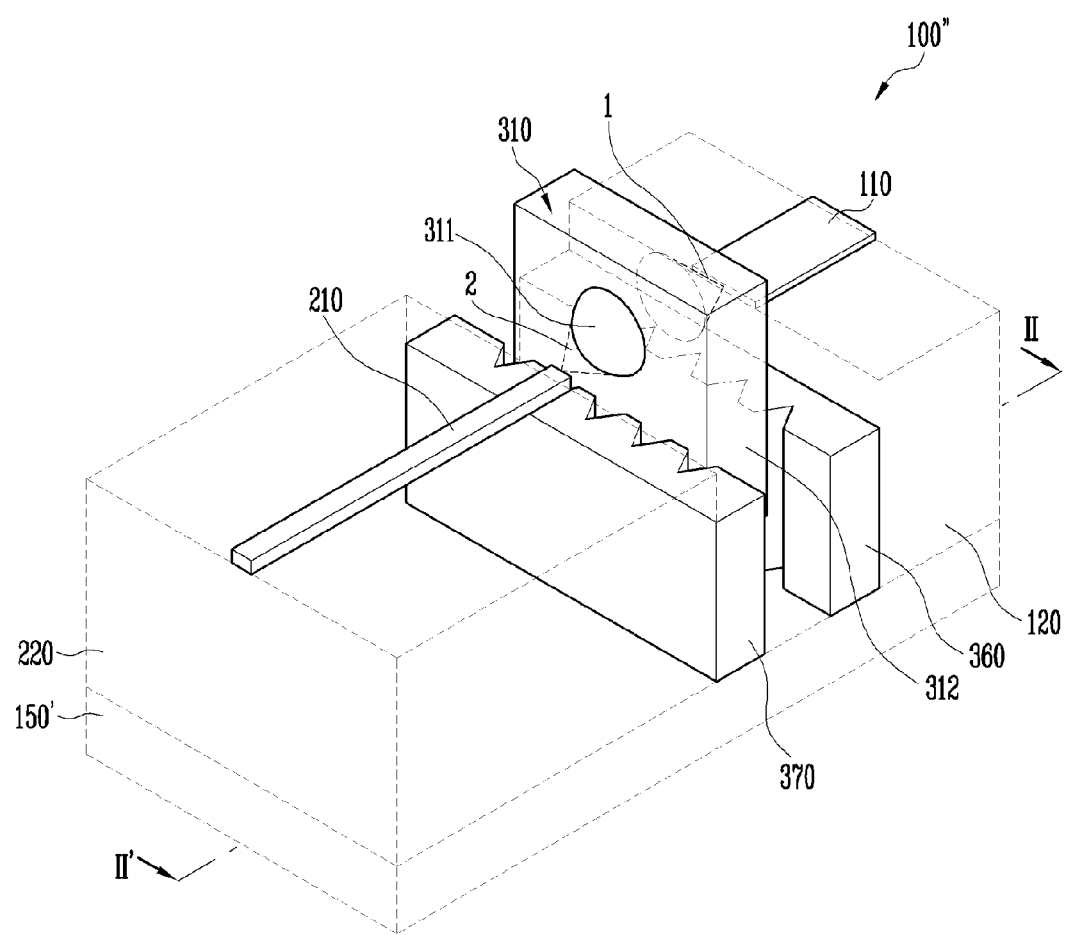
FIG. 6 is a perspective view of the embodiment of FIG. 5.

FIG. 5 is a side view of an optical module according to another embodiment of the present invention. FIG. 6 is a perspective view of the embodiment of FIG. 5. An optical module 100" according to another embodiment of the present invention includes the substrate 150', a plurality of mounts 120, 220, 360, and 370 fixed to the substrate 150', the light source 110 fixed to the plurality of mounts 120, 220, 360, and 370, the wave guide 210 and the lens system 310, and first and second adhesives 460 and 470 for fixing the lens system 310 to a pair of lens mounts 360 and 370.

Since the plurality of mounts 120, 220, 360, and 370 include the light source mount 120, the wave guide mount 220, and the pair of lens mounts 360 and 370. The light source 110 is mounted on the light source mount 120 and the wave guide 210 is mounted on the wave guide mount 220. Since the light source 110, the light source mount 120, the wave guide 210, and the wave guide mount 220 are as described above with reference to FIGS. 1 and 2, detailed description thereof will not be given.

The lens system 310 optically combines the light source 110 and the wave guide 210. The lens system 310 includes the lens 311 optically aligned with the light source 110 and the wave guide 210. Since the lens 311 is as described above with reference to FIGS. 1 and 2, detailed description thereof will not be given.

The lens system 310 includes the lens support 312 for supporting the lens 311 and fixing the lens system 310 to the pair of lens mounts 360 and 370. The lens support 312 surrounds the lens 311 and extends downward from the lens 311 in the height direction to be positioned between the pair of lens mounts 360 and 370.

The pair of lens mounts 360 and 370 include the first lens mount 360 provided in a space between the light source 110 and the lens system 310 and the second lens mount 370 provided in a space between the wave guide 210 and the lens system 310.

The first lens mount 360 is provided between the light source 110 and the lens system 310 that are separate from each other in the optical axis direction. The second lens mount 370 is provided between the wave guide 210 and the lens system 310 that are separate from each other in the optical axis direction.

Figure 7:
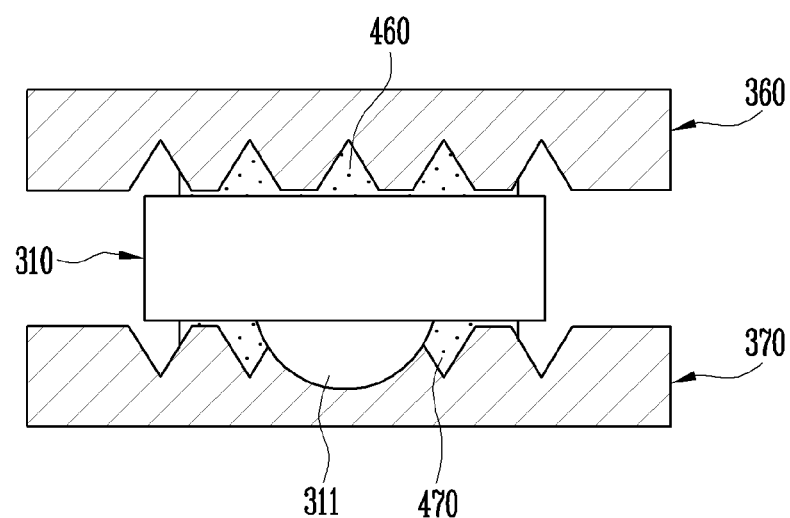
FIG. 7 is a partially enlarged top view of the embodiment of FIG. 5.
Figure 8:
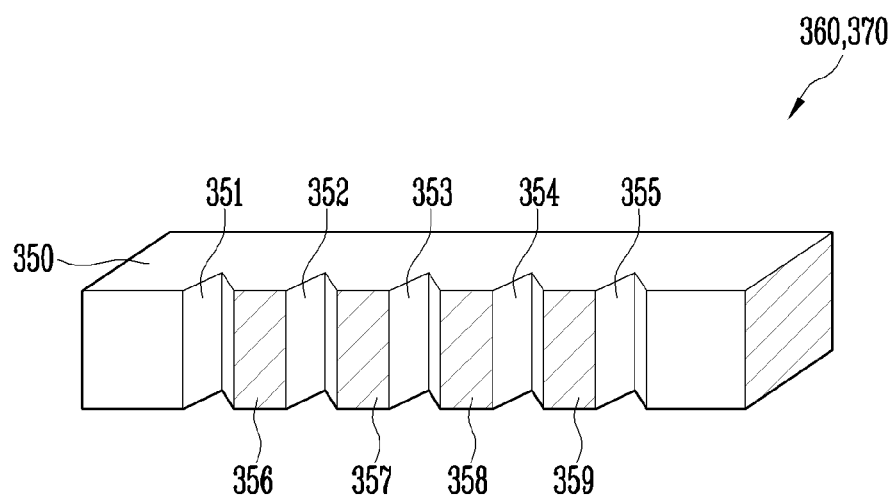
FIG. 8 is an enlarged perspective view of a lens mount provided in the embodiment of FIG. 5.

FIG. 7 is a top view illustrating the lens system 310 fixed between the pair of lens mounts 360 and 370 by the first and second adhesives. FIG. 8 is a perspective view illustrating the first or second lens mount 360 or 370. Since the first lens mount 360 and the second lens mount 370 are arranged in different directions and have the same shape, the first lens mount 360 and the second lens mount 370 are illustrated as one in FIG. 8. Hereinafter, a configuration of the first lens mount 360 is described in detail, which is applied to the second lens mount 370.

The first lens mount 360 includes a mount body 350 and a plurality of grooves 351, 352, 353, 354, and 355 formed on one side surface of the mount body 350. The first and second lens mounts 360 and 370 are obtained by providing a plurality of grooves in each of the first and second lens mounts 320 and 330 of FIGS. 1 and 2. The mount body 350 has the same shape as the first and second lens mounts 320 and 330 described above with reference to FIGS. 1 and 2. Therefore, detailed description of the mount body 350 will not be given.

The plurality of grooves 351, 352, 353, 354, and 355 are formed on a surface of the mount body 350 that faces the lens support 312 with a predetermined depth. The plurality of grooves 351, 352, 353, 354, and 355 extend from a lower portion to an upper portion of the mount body 350 in the height direction and are opened toward the upper and lower portions of the mount body 350. The plurality of grooves 351, 352, 353, 354, and 355 are separate from each other and are parallel with each other and a plurality of surfaces 356, 357, 358, and 359 are positioned among the plurality of grooves 351, 352, 353, 354, and 355.

Minute gaps exist between the plurality of surfaces 356, 357, 358, and 359 and the lens support 312. The first adhesive 460 and the second adhesive 470 respectively fill spaces between the plurality of surfaces and the lens support 312 and spaces between the plurality of grooves and the lens support 312 and fix the lens system 310 to the pair of lens mounts 360 and 370. Sizes of the minute gaps between the plurality of surfaces 356, 357, 358, and 359 and the lens support 312 may be such that the lens 311 may move in the x and y axes without being interrupted by the first and second lens mounts 360 and 370, for example, about 10 µm.

The plurality of grooves 351, 352, 353, 354, and 355 have such widths that the first and second adhesives may move in a capillary phenomenon. Referring to FIG. 8, the plurality of grooves 351, 352, 353, 354, and 355 become narrower as the plurality of grooves 351, 352, 353, 354, and 355 are depressed from a surface of the mount body. Cross-sections seen on an x-z axes plane are triangular. However, the present invention is not limited thereto.

According to the current embodiment, the number of grooves 351, 352, 353, 354, and 355 is five. However, the present invention is not limited thereto. The sizes of the grooves, the number of grooves, and a distance by which the grooves are separate from each other may be increased or reduced as occasion demands. When the distance between the first and second lens mounts and the lens system is within 10 μm, force of static friction and electrostatic force on a contact surface affect a degree of precision of an aligning apparatus. Since the force of static friction and the electrostatic force increase as a contact area between the first and second lens mounts and the lens system increases, it is possible to improve the degree of precision of light alignment by determining the number of grooves and the distance by which the grooves are separate from each other so that the force of static friction and the electrostatic force are sufficiently reduced.

On the other hand, since combination strength between the lens system and the first and second lens mounts is proportional to the contact area, the sizes of the grooves, the number of grooves, and the distance by which the grooves are separate from each other may be determined by considering the combination strength.

The first adhesive 460 fills a gap between the first lens mount 360 and the lens support 312 and fixes the lens support 312 to the first lens mount 360. Specifically, the first adhesive 460 fills the plurality of grooves formed in the first lens mount 360 and gaps between surfaces positioned among the plurality of grooves and the lens support 312.

The second adhesive 470 fills a gap between the second lens mount 370 and the lens support 312 and fixes the lens support 312 to the second lens mount 370. Specifically, the second adhesive 470 fills the plurality of grooves formed in the second lens mount 370 and gaps between surfaces positioned among the plurality of grooves and the lens support 312.

The first adhesive 460 and the second adhesive 470 may be partially filled in the grooves 351 and 355 in the outermost portions of the first and second lens mounts 360 and 370 in accordance with a width of the lens system 310.

The first adhesive 460 and the second adhesive 470 may be hardened epoxy. When the first and second adhesives 460 and 470 are epoxy, in accordance with viscosity, in a process of supplying epoxy to the gaps between the pair of lens mounts and the lens support 312, epoxy may spread. The plurality of grooves 351, 352, 353, 354, and 355 provide spaces that may store remaining epoxy and prevent epoxy from spreading.

Therefore, since the plurality of grooves 351, 352, 353, 354, and 355 function as dams for storing epoxy, it is possible to prevent epoxy from spreading and to use epoxy with low viscosity. When epoxy with low viscosity is used as the adhesives, it is possible to precisely control an amount of implanted epoxy and to reduce an amount of generated vapor so that reliability of a junction unit is improved. In addition, since it is possible to minimize frictional force caused by viscosity during an additional minute light alignment work process of the lens after implanting epoxy, a gripper may grip the lens with smaller force so that it is possible to prevent the lens system from being damaged by gripping force.

The substrate 150' is a platform that entirely supports the optical module 100". The substrate 150' includes the plate-shaped substrate body 151 on which all the plurality of mounts 120, 220, 360, and 370 may be mounted. The through hole 152 through which the first and second adhesives 460 and 470 are implanted is formed in the substrate body 151.

The substrate 150' illustrated in FIG. 5 illustrates a cross-section taken along the line II-II' of FIG. 6. The through hole 152 formed in the substrate 150' is connected to the plurality of grooves 351, 352, 353, 354, and 355 opened toward a lower portion and gaps between the plurality of surfaces 356, 357, 358, and 359 and the lens support 312. A diameter of the through hole 152 is large so that the first and second adhesives may be supplied to gaps between the lens support 312 and the pair of lens mounts 360 and 370.

In comparison with the embodiment of FIGS. 1 and 3, in the embodiment of FIG. 5, a contact area between the pair of lens mounts 360 and 370 and the lens support 312 becomes smaller due to the plurality of grooves 351, 352, 353, 354, and 355. Therefore, since force of static friction and electrostatic force are reduced between the lens support 312 and the pair of lens mounts, during the light alignment, an operation of controlling a position of the lens system 310 is not interrupted by the force of static friction and the electrostatic force and a degree to which the operation of controlling the position of the lens system 310 is interrupted is minimized.

Therefore, since it is possible to minimize influence the force of static friction and the electrostatic force have on the light alignment while removing the degree of freedom of the light alignment in the optical axis direction and increasing the contact area with the lens system due to the pair of lens mounts having the above configuration, it is possible to precisely align light.

Figure 9:
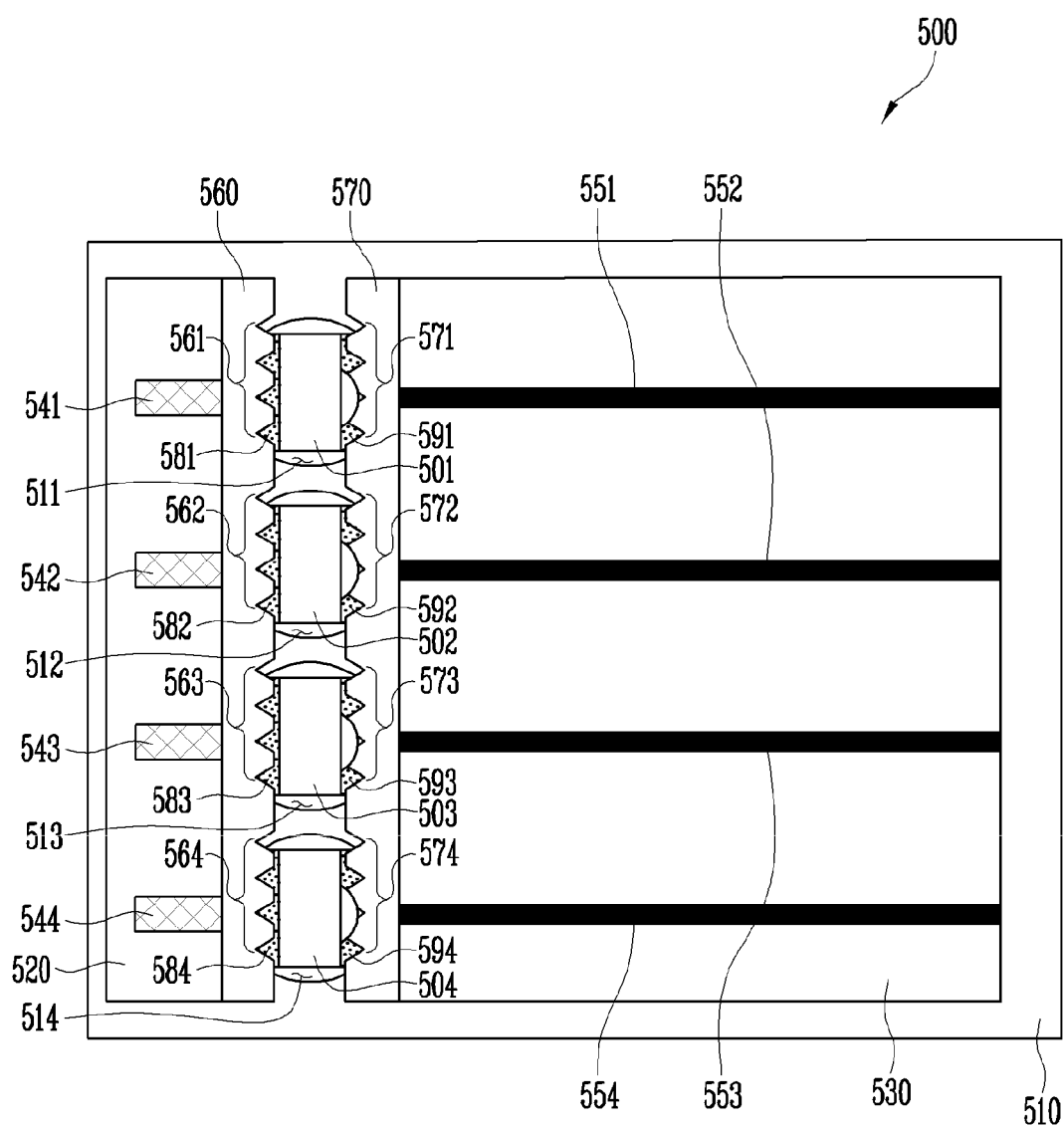
FIG. 9 is a top view of a multi-channel optical module according to an embodiment of the present invention.
Figure 10:
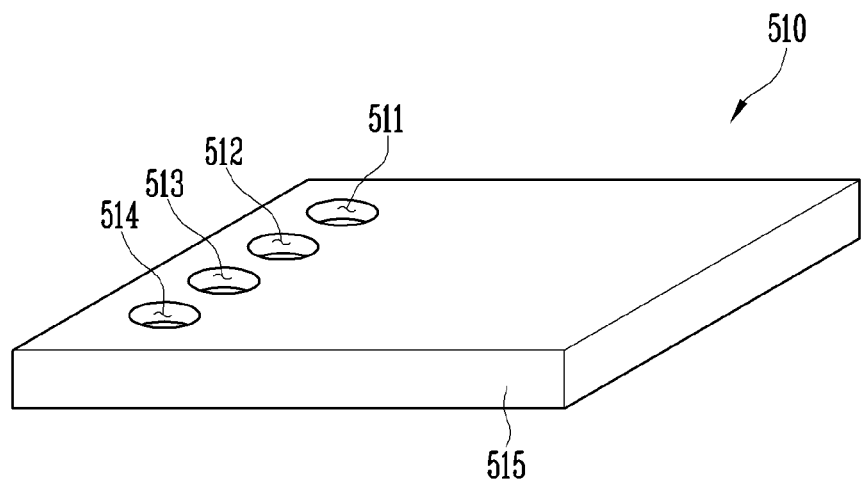
FIG. 10 is an enlarged perspective view of a substrate provided in the embodiment of FIG. 9.

FIG. 9 is a top view of a multi-channel optical module 500 according to an embodiment of the present invention. FIG. 10 is an enlarged perspective view of a substrate provided in the embodiment of FIG. 9. The multi-channel optical module 500 according to the embodiment of the present invention incudes a substrate 510, a plurality of mounts 520, 530, 560, and 570 fixed to the substrate 510, a plurality of light sources 541, 542, 543, and 544, a plurality of wave guides 551, 552, 553, and 554, and a plurality of lens systems 501, 502, 503, and 504. The plurality of mounts include the light source mount 520, the wave guide mount 530, and the pair of lens mounts 560 and 570.

The embodiment of FIG. 9 is an example in which the optical module of the embodiment of FIG. 5 is implemented by multiple channels. A connection relationship among a light source by channel, a lens system, and a wave guide is actually the same as described with reference to the embodiment of FIG. 5. Therefore, the content omitted hereinafter may be replaced by description of the configuration of the embodiment of FIG. 5.

Referring to FIGS. 9 and 10, the substrate 510 is a platform that entirely supports the multi-channel optical module 500. A side view of the multi-channel optical module 500 according to the present embodiment is not illustrated. However, it is understood that the multi-channel optical module 500 is the same as the optical module 100" illustrated in FIG. 5. In particular, the light source mount 120, the pair of lens mounts 360 and 370, and the wave guide mount 220 of FIG. 5 may correspond to the light source mount 520, the pair of lens mounts 560 and 570, and the wave guide mount 530 of FIG. 9. According to the current embodiment, in order to implement the multi-channel optical module, widths of the mounts 520, 530, 560, and 570 are larger than in FIG. 5.

The substrate 510 includes a plate-shaped substrate body 515 on which all the mounts 520, 530, 560, and 570 may be mounted. The substrate body 515 includes through holes 511, 512, 513, and 514 provided in the respective channels in order to implant the adhesives.

A shape of a side cross-section of the substrate 510 is actually the same as a shape of a side cross-section of the substrate 150' of FIG. 5. In order to implement the multi-channel optical module, a width of the substrate body 515 is larger than in FIG. 5. In the embodiment of FIG. 5, only one through hole 152 is formed. However, in the current embodiment, the through holes 511, 512, 513, and 514 are provided in the respective channels. A shape of each of the through holes 511, 512, 513, and 514 provided in the respective channels is actually the same as a shape of the through hole 152 of the embodiment of FIG. 5. However, the present invention is not limited thereto and the number of through holes may vary. For example, one through hole connected to all channels may be provided.

The light source mount 520 is actually the same as the light source mount 120 described with reference FIG. 1. However, in order to implement the multi-channel optical module, the light source mount 520 has a larger width and the plurality of light sources 541, 542, 543, and 544 are mounted in parallel by a predetermined distance. The wave guide mount 530 is actually the same as the wave guide mount 220 described with reference to FIG. 1. However, in order to implement the multi-channel optical module, the wave guide mount 530 has a larger width and the plurality of wave guides 551, 552, 553, and 554 are mounted in parallel by a predetermined distance.

The plurality of light sources 541, 542, 543, and 544 includes the first channel light source 541, the second channel light source 542, the third channel light source 543, and the fourth channel light source 544. Since the plurality of light sources may be linearly arranged in a width direction. Since the first through fourth channel light sources 541, 542, 543, and 544 are actually the same as the light source 110 described above with reference to FIG. 1, detailed description thereof will not be given.

The plurality of wave guides 551, 552, 553, and 554 includes the first channel wave guide 551 optical axis aligned with the first channel light source 541, the second channel wave guide 552 optical axis aligned with the second channel light source 542, the third channel wave guide 553 optical axis aligned with the third channel light source 543, and the fourth channel wave guide 554 optical axis aligned with the fourth channel light source 544. Since the first through fourth channel wave guides 551, 552, 553, and 554 are actually the same as the wave guide 210 described above with reference to FIG. 1.

The plurality of lens systems 501, 502, 503, and 504 includes the first channel lens system 501 for optically combining the first channel light source 541 and the first channel wave guide 551, the second channel lens system 502 for optically combining the second channel light source 542 and the second channel wave guide 552, the third channel lens system 503 for optically combining the third channel light source 543 and the third channel wave guide 553, and the fourth channel lens system 504 for optically combining the fourth channel light source 544 and the fourth channel wave guide 554.

A configuration of each of the first through fourth channel lens systems 501, 502, 503, and 504 is the same as a configuration of the lens system 310 described with reference to FIG. 1. That is, each of the first through fourth channel lens systems 501, 502, 503, and 504 includes a lens and a lens support that surrounds the lens and extends between the pair of lens mounts 560 and 570.

The pair of lens mounts 560 and 570 include the first lens mount 560 provided in a space between the light sources 541, 542, 543, and 544 of the respective channels and the lens systems 501, 502, 503, and 504 of the respective channels and the second lens mount 570 provided in a space between the wave guides 551, 552, 553, and 554 of the respective channels and the lens systems 501, 502, 503, and 504 of the respective channels. In the multi-channel optical module 500 according to the embodiment of the present invention, first adhesives 581, 582, 583, and 584 for fixing the plurality of lens systems 501, 502, 503, and 504 to the first lens mount 560 are provided by channel and second adhesives 591, 592, 593, and 594 for fixing the plurality of lens systems 501, 502, 503, and 504 to the second lens mount 570 are provided by channel.

The first and second lens mounts 560 and 570 extend in a width direction and cross the respective channels. The first lens mount 560 includes a plurality of first channel grooves 561 formed in a surface that faces the first channel lens system 501, a plurality of second channel grooves 562 formed in a surface that faces the second channel lens system 502, a plurality of third channel grooves 563 formed in a surface that faces the third channel lens system 503, and a plurality of fourth channel grooves 564 formed in a surface that faces the fourth channel lens system 504.

The first adhesives 581, 582, 583, and 584 respectively fill gaps between the surfaces in which the first through fourth channel grooves 561, 562, 563, and 564 of the first lens mount 560 are formed and lens supports of the first through fourth channel lens systems 501, 502, 503, and 504, which is the same as described with reference to the embodiment of FIG. 5.

The second lens mount 570 includes a plurality of first channel grooves 571 formed in the surface that faces the first channel lens 501, a plurality of second channel grooves 572 formed in the surface that faces the second channel lens system 502, a plurality of third channel grooves 573 formed in the surface that faces the third channel lens system 503, and a plurality of fourth channel grooves 574 formed in the surface that faces the fourth channel lens system 504.

The second adhesives 591, 592, 593, and 594 respectively fill gaps between the surfaces in which the first through fourth channel grooves 571, 572, 573, and 574 of the second lens mount 570 are formed and lens supports of the first through fourth channel lens systems 501, 502, 503, and 504, which is the same as described with reference to the embodiment of FIG. 5.

According to the current embodiment, the first lens mount 560 is provided for four channels and the second lens mount 570 is provided for four channels. However, the present invention is not limited thereto. According to another embodiment, the first and second lens mounts may include separate mounts provided one by one in each channel.

Referring to FIGS. 11 through 14, a light aligning method of the multi-channel optical module 500 will be described in detail. Hereinafter, the multi-channel optical module 500 is taken as an example. However, the light aligning method may be applied to the optical module 100" according to the embodiment of FIG. 5.

Figure 11:
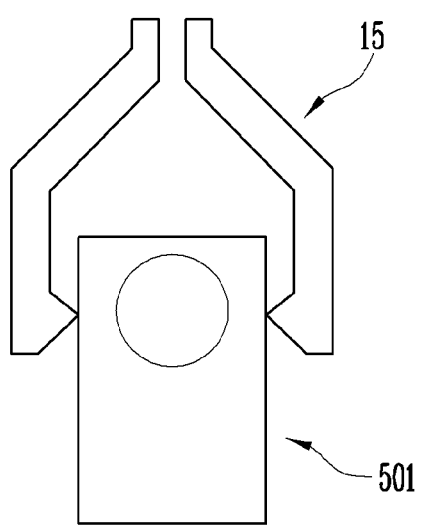
FIG. 11 is a front view illustrating that a gripper grips the first channel lens system of the embodiment of FIG. 9.
Figure 12:
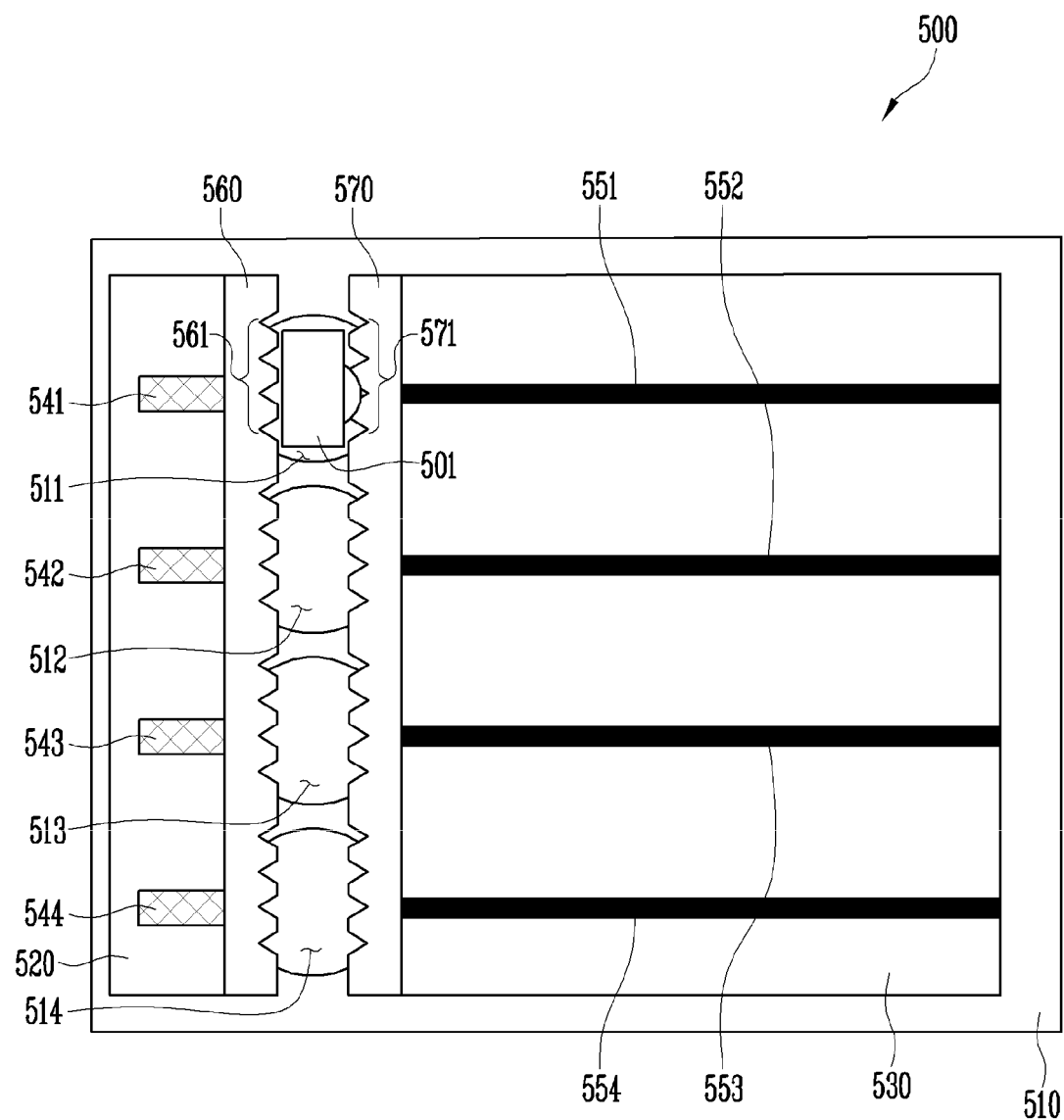
FIG. 12 is a top view illustrating that the lens system of FIG. 11 is placed between a pair of lens mounts.

Referring to FIGS. 11 and 12, the first channel lens system 501 is inserted between the first lens mount 560 and the second lens mount 570 by a gripper 15. The first channel light source 541 and the first channel wave guide 551 are separate from each other in an optical axis direction and are aligned along the optical axis. A height of the first channel lens system 501 is determined so that an output end of the first channel light source 541 and an input end of the first channel wave guide 551 are positioned in a focusing distance of the first channel lens system 501. Since a position of the first channel lens system 501 in the optical axis direction is previously determined by the first and second lens mounts 560 and 570, as described above, the degree of freedom of alignment in the optical axis direction rarely exists.

After positioning the first channel lens system 501 between the first lens mount 560 and the second lens mount 570 by using the gripper 15, a power source is applied to the first channel light source 541 and the position of the first channel lens system 501 is controlled with respect to the x-y axes (refer to the x-y-z axes of FIG. 5) so that an amount of light concentrated on the first channel wave guide 551 is maximal. As described above, since there rarely exists the degree of freedom of alignment in the optical axis direction (a z axis direction), the first channel lens system 501 may be optically aligned only by an aligning apparatus that moves in the x-y axes.

After controlling the position of the first channel lens system 501, a nozzle 25 for supplying an adhesive may be inserted through a through hole 511 corresponding to the first channel from a bottom surface of the substrate 510. The nozzle 25 inserted into the through hole 511 reaches a lower space 309 (refer to FIG. 5) of the first channel lens system 501 and a first adhesive and a second adhesive may be respectively implanted between the first and second lens mounts and the lens support of the first channel lens system 501. Hereinafter, the first and second adhesives are illustrated as epoxy.

Figure 13:
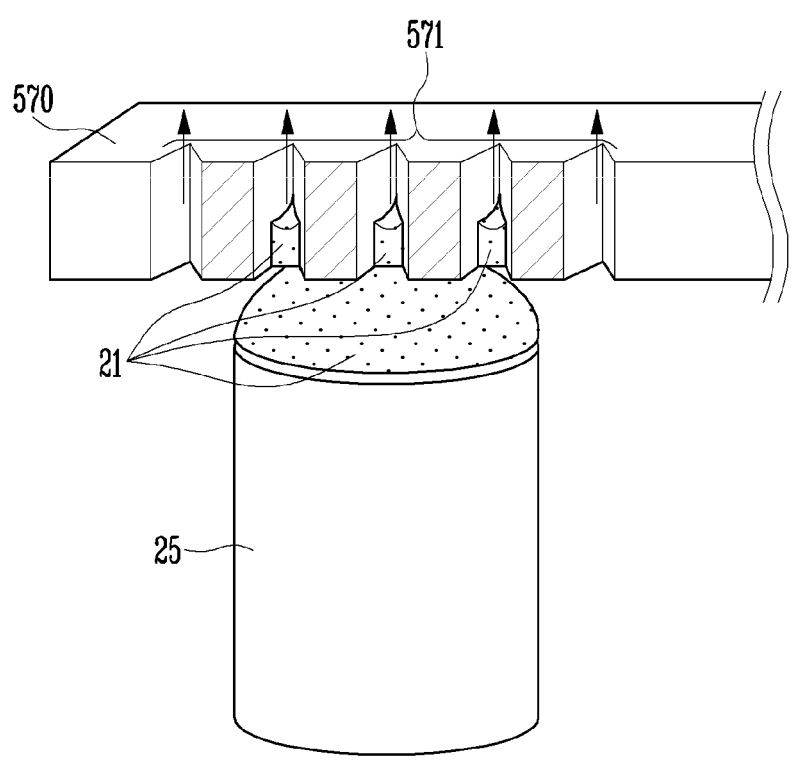
FIG. 13 is a perspective view illustrating that epoxy is implanted through a plurality of grooves of a lens mount.

Referring to FIG. 13, epoxy 21 is implanted along the plurality of first channel grooves 571 provided in a surface that faces the first channel lens system 501 of the second lens mount 570. In the plurality of first channel grooves 571, the epoxy 21 may be supplied from a lower portion of the second lens mount 570 to an upper portion of the second lens mount 570, that is, in a direction opposite to gravity, in a capillary phenomenon. Then, an amount of the epoxy 21 supplied to the upper portion of the second lens mount 570 increases so that up to the lens support of the first channel lens system 501 and an interface of a contact portion of the second lens mount 570 is filled with epoxy and epoxy smears into the interface by the capillary phenomenon.

Figure 14:
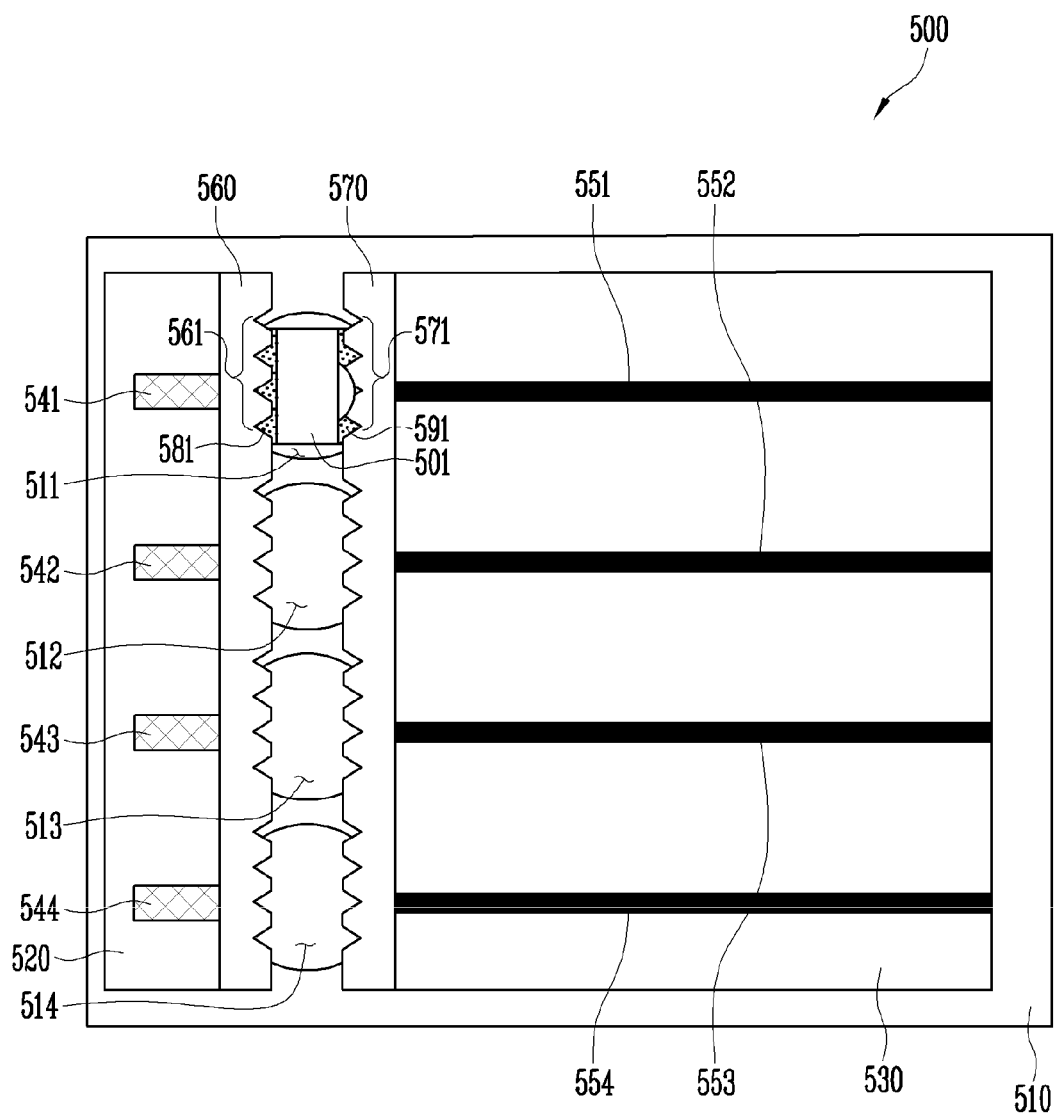
FIG. 14 is a top view illustrating that epoxy is implanted as illustrated in FIG. 13 and is hardened so that a first channel lens system is fixed between the pair of first channel lens mounts.

In the same principle, epoxy is implanted between the first lens mount 560 and the lens support of the first channel lens system 501. Then, as occasion demands, after optically aligning the first channel lens system 501 in addition, epoxy is hardened so that the first channel lens system 501 is completely fixed as illustrated in FIG. 14. An UV epoxy hardening method may be used as an epoxy hardening method. However, the present invention is not limited thereto.

The second through fourth channel lens systems 502, 503, and 504 are provided by such a method and may be optically aligned by channel. The first through fourth channel lens systems 501, 502, 503, and 504 may be simultaneously fixed in the same principle.

Since it is possible to prevent epoxy from spreading to a neighboring channel while using epoxy with low viscosity due to a plurality of grooves provided by channel in the first and second lens mounts 460 and 470, it is possible to implement a small multi-channel optical module. In addition, since epoxy with low viscosity may be used, when epoxy rises in the grooves of the lens mounts in the capillary phenomenon, air is pushed so that an amount of vapor is reduced and reliability of a junction unit increases. In addition, since epoxy with low viscosity may be used, frictional force caused by viscosity of epoxy is reduced so that it is possible to reduce gripping force required by the gripper 15 and to prevent the lens system from being damaged.

On the other hand, in the embodiment of FIG. 3, epoxy may be implanted between the first and second lens mounts 320 and 330 and the lens support 312 of the lens system by inserting the nozzle 25 into the through hole 152. In the embodiment of FIG. 1, epoxy may be implanted by making the nozzle 25 approach side portions or upper portions of the pair of lens mounts.

Figure 15:
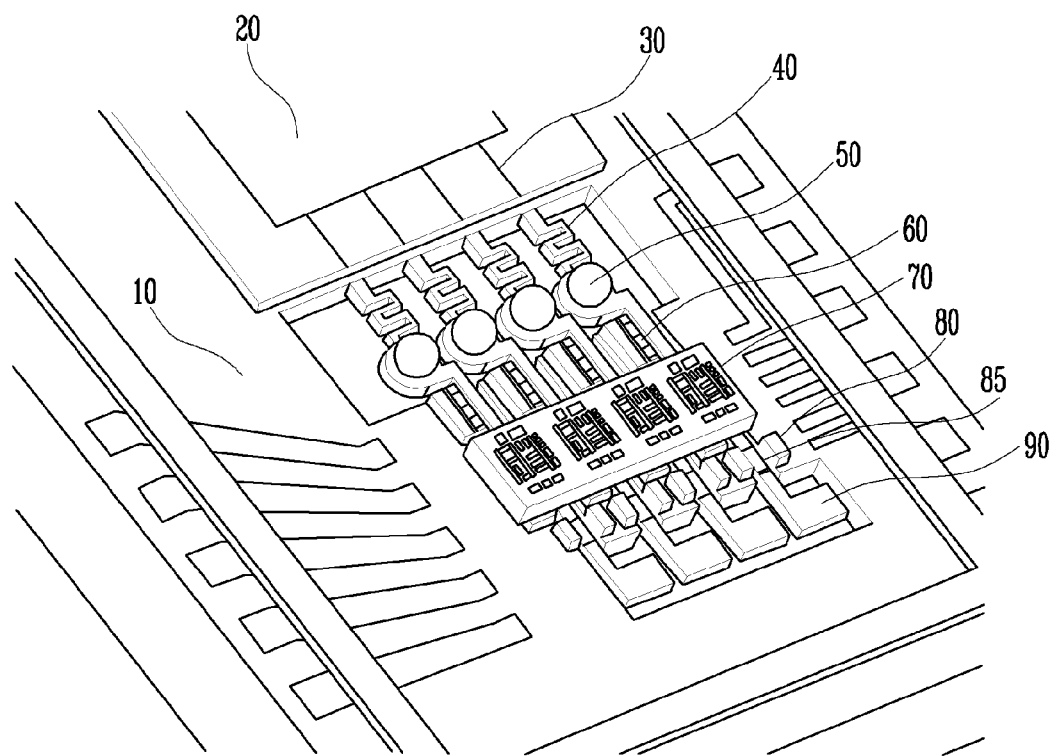
FIG. 15 is a perspective view illustrating a schematic configuration of a conventional optical module optically aligned by soldering heating.

FIG. 15 illustrates an optical module to which a soldering melting method is applied according to prior art. In the optical module of FIG. 15, after inserting a ball lens 50 between a wave guide 30 and a laser 60, a position of the ball lens 50 is controlled by using a spring 40 in a light output direction so that an amount of light incident on the wave guide 30 is maximal. The wave guide 30 is an input wave guide of a planar lightwave circuit (PLC) multiplexer 20. The ball lens 50 is inserted into a holder etched on a substrate 10 and a handle 90 is positioned at an end of the holder and may be controlled in three axes.

After controlling a position of the ball lens 50 fixed to the holder by manipulating the handle 90, soldering 80 is melted so that the handle 90 is fixed. A metal pad 85 is provided in the handle 90 and the soldering 80 is melted so that the handle 90 is fixed. A current flows through a surface with the soldering 80 of FIG. 1 so that the soldering 80 is melted. After fixing the handle 90, a high-seed driver IC 70 is mounted.

A structure of the conventional optical module is complicated and prices of parts increase due to the manufacturing of the spring 40 using a semiconductor process and the manufacturing of a high-temperature heater for melting the soldering 80.

Figure 16:
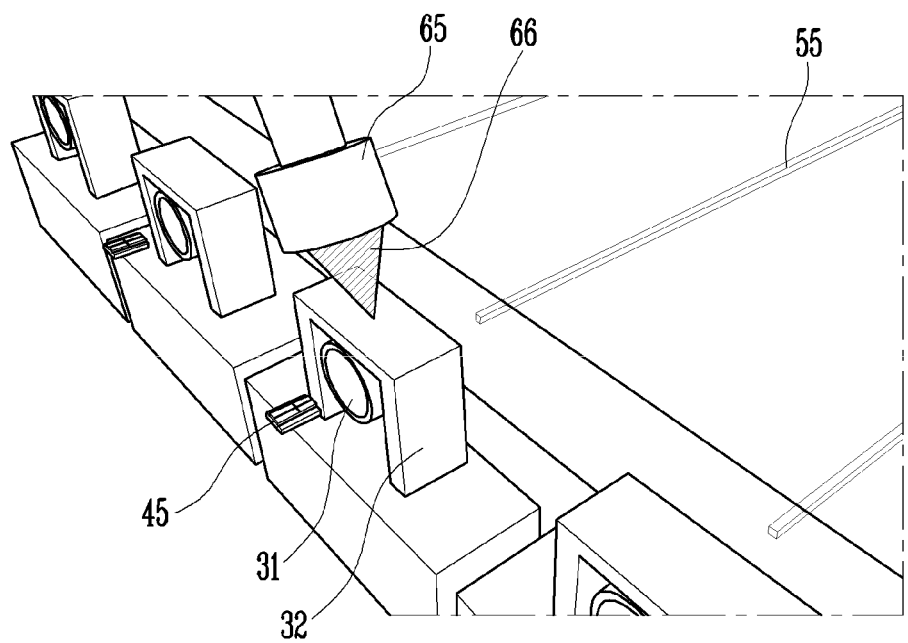
FIG. 16 is a perspective view schematically illustrating that a conventional optical module is optically aligned by laser welding.

FIG. 16 illustrates an optical module to which a laser welding method is applied according to prior art. In the optical module of FIG. 16, a lens holder 32 for modifying a position of a lens 31 by thermal modification is inserted between a wave guide 55 and a light source 45, a frame of the lens holder 32 is instantaneously melt by a laser beam 66 output from a laser head 65, and the position of the lens 31 is controlled by permanent modification that occurs in a cooling process.

The conventional optical module requires to a correct shape of the lens holder 32 and high-price high-output laser source. After irradiating the high-output laser, due to permanent thermal modification of the lens holder, it is not possible to correct an alignment error.

According to the present invention, the epoxy hardening method is applied so that it is possible to simplify a structure and manufacturing processes of an optical module and to reduce expenses of required parts and equipment in comparison with the light aligning method of the above-described conventional optical module.

What is claimed is:

1. An optical module comprising:
    a light source configured to output a beam in a first direction;
    a wave guide configured to receive the beam output from the light source;
    a substrate;
    first and second lens mounts disposed on the substrate, the first and second lens mounts being aligned in the first direction;
    a lens system disposed between the first and second lens mounts and configured to optically couple the light source to the wave guide;

a first adhesive configured to fix the lens system to the first lens mount; and
a second adhesive configured to fix the lens system to the second lens mount,
wherein the substrate comprises a through hole opened toward a gap between the first lens mount and the lens support and/or a gap between the second lens mount and the lens support.

2. The optical module of claim 1,
wherein the lens system comprises:
a lens optically aligned with the light source and the wave guide; and
a lens support configured to support the lens, the lens support extending from the lens and being disposed between the first lens mount and the second lens mount,
wherein the first adhesive fills the gap between the first lens mount and the lens support, and
wherein the second adhesive fills the gap between the second lens mount and the lens support.

3. The optical module of claim 2,
wherein at least one of the first lens mount and the second lens mount comprises a plurality of grooves on a surface that faces the lens system, and
wherein at least one of the plurality of grooves is filled with a corresponding adhesive.

4. The optical module of claim 3, wherein the plurality of grooves extend vertically.

5. The optical module of claim 4, wherein the plurality of grooves are separated from each other in a horizontal direction.

6. The optical module of claim 2, further comprising:
a light source mount on which the light source is mounted; and
a wave guide mount being separated from the light source mount in the optical axis direction, the wave guide being mounted on the wave guide mount
wherein the substrate is configured to support the light source mount and the wave guide mount,
wherein the first lens mount is provided between the light source mount and the lens support, and
wherein the second lens mount is provided between the wave guide mount and the lens support.

7. The optical module of claim 1,
wherein the lens support extends downward from the lens, and
wherein the through hole of the substrate is opened toward a lower portion of the lens support.

8. The optical module of claim 1, wherein at least one of the first adhesive and the second adhesive is hardened epoxy.

9. The optical module of claim 8, wherein at least one of the first lens mount and the second lens mount comprises a transparent material.

10. The optical module of claim 1,
wherein at least one of the first lens mount and the second lens mount comprises a plurality of grooves on a surface that faces the lens system, and
wherein at least one of the plurality of grooves is filled with a corresponding adhesive.

11. A multi-channel optical module comprising:
a plurality of light sources configured to output a plurality of beams along a plurality of optical axes, the plurality of light sources being separated from each other in a direction perpendicular to the optical axes;
a plurality of wave guides respectively receiving the plurality of beams output from the plurality of light sources;
at least one first lens mount and at least one second lens mount, the at least one first lens mount being disposed with the at least one second lens mount along an axis parallel to at least one of the optical axes;
a plurality of lens systems disposed between the at least one first lens mount and the at least one second lens mount, the plurality of lens systems being configured to respectively optically couple the plurality of light sources and the plurality of wave guides;
a first adhesive configured to fix the plurality of lens systems to the at least one first lens mount, the first adhesive being coupled between the plurality of lens systems and the at least one first lens mount and being disposed along the axis parallel to the optical axis; and
a second adhesive configured to fix the plurality of lens systems to the at least one second lens mount, the second adhesive being coupled between the plurality of lens systems and the at least one second lens mount and being disposed along the axis parallel to the optical axis;
at least one light source mount on which the plurality of light sources are mounted;
at least one wave guide mount on which the plurality of wave guides are mounted; and
a substrate configured to support the light source mount, the wave guide mount, and the first and second lens mounts,
wherein the substrate comprises a through hole opened toward between at least one of the plurality of lens systems and the first lens mount and/or at least one of the plurality of lens systems and the second lens mount and passing through the substrate.

12. The multi-channel optical module of claim 11,
wherein a surface that faces the lens system of at least one of the first lens mount and the second lens mount includes a plurality of grooves, and
wherein the plurality of grooves are separated from each other.

13. The multi-channel optical module of claim 12, wherein the plurality of grooves extend in a direction perpendicular to the optical axes.

14. The multi-channel optical module of claim 13, wherein the plurality of grooves extend in a direction perpendicular to a direction in which the plurality of light sources are separated from each other.

15. The optical module of claim 10, wherein the lens system is disposed above the substrate, the plurality of grooves extend vertically, and the plurality of grooves are separated from each other in a horizontal direction.

* * * * *